Sept. 18, 1923.
E. A. SPERRY
1,468,330
SYNCHRONOUS TRANSMISSION SYSTEM
Filed Dec. 5, 1919    3 Sheets-Sheet 1
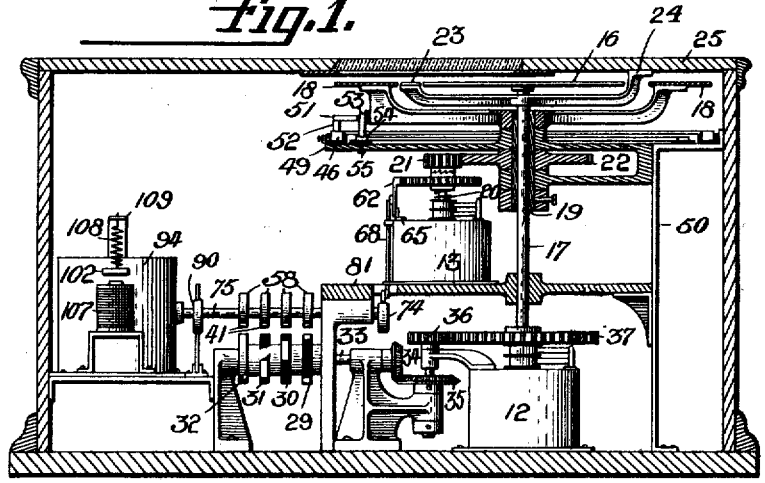
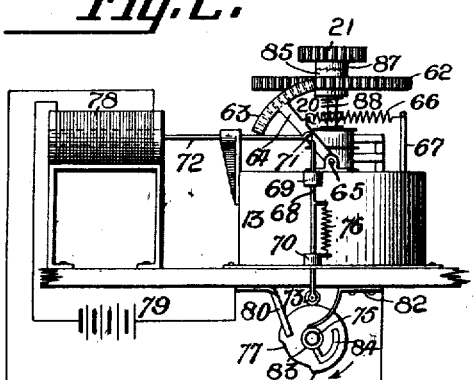
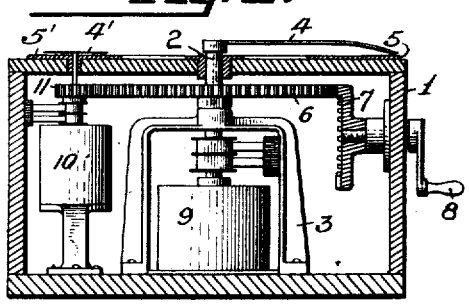
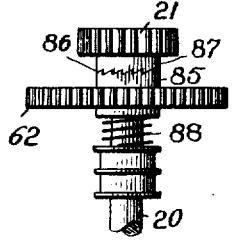
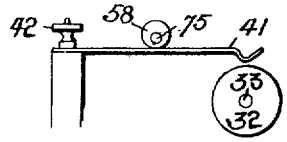
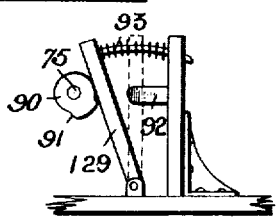
INVENTOR
ELMER A. SPERRY
BY
Herbert H. Thompson
HIS ATTORNEY.

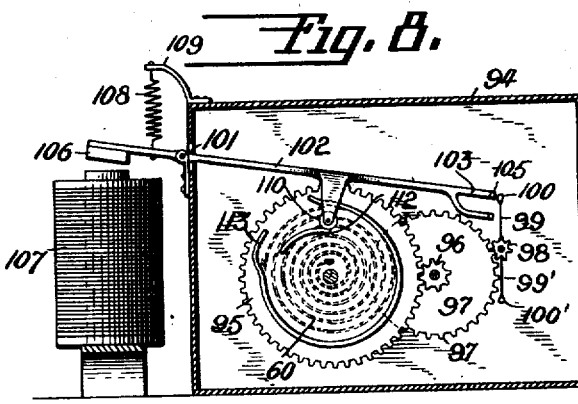
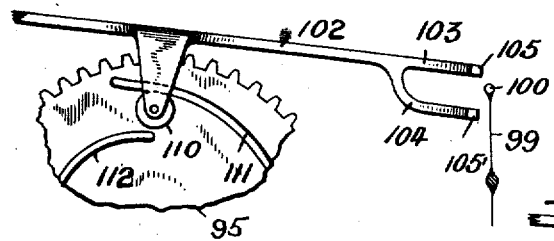
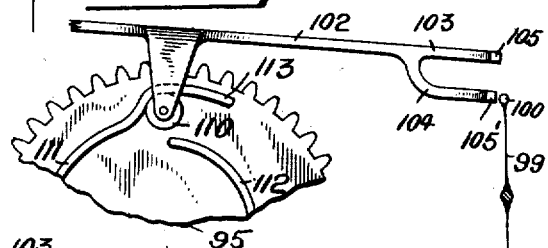
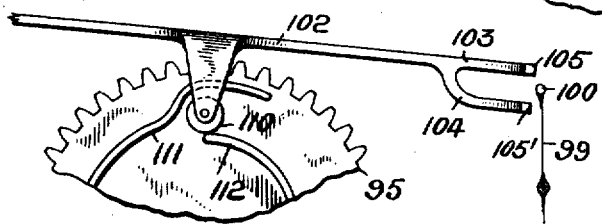
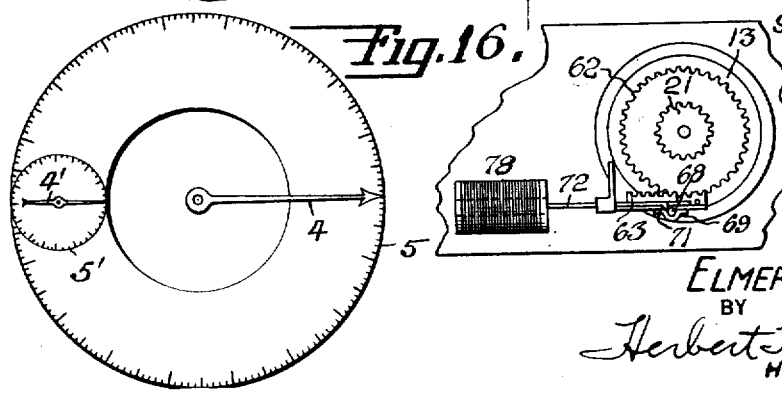
INVENTOR
ELMER A. SPERRY
BY
Herbert H. Thompson
HIS ATTORNEY.

Sept. 18, 1923.
E. A. SPERRY
1,468,330
SYNCHRONOUS TRANSMISSION SYSTEM
Filed Dec. 5, 1919     3 Sheets-Sheet 3
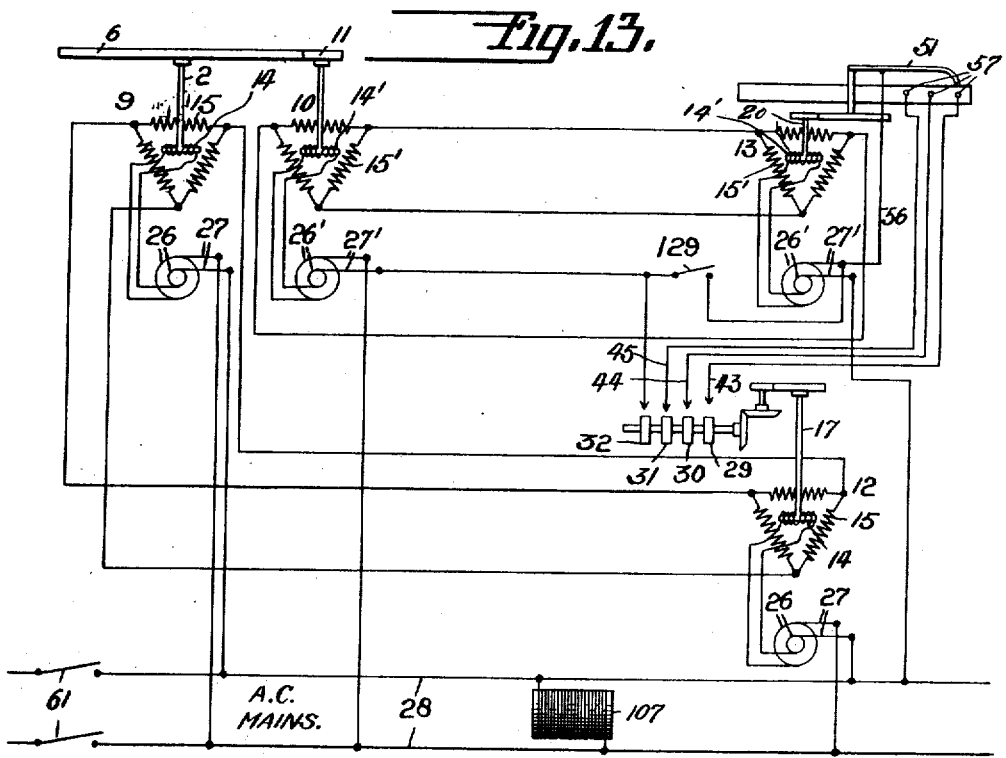
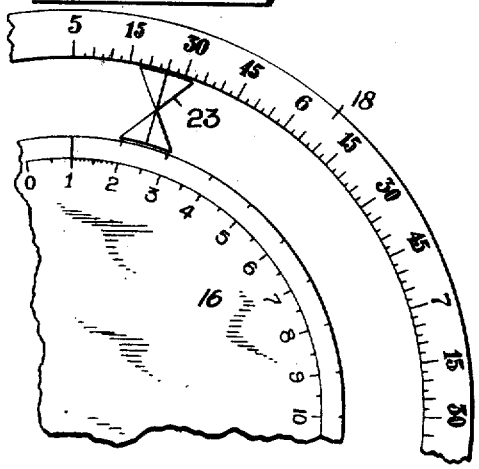
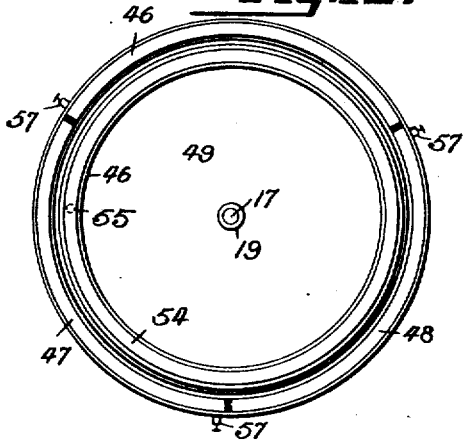
INVENTOR
ELMER A. SPERRY
BY
Herbert H. Thompson
HIS ATTORNEY.

Patented Sept. 18, 1923.

1,468,330

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

SYNCHRONOUS TRANSMISSION SYSTEM.

Application filed December 5, 1919. Serial No. 342,659.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Synchronous Transmission Systems, of which the following is a specification.

This invention relates to transmission systems adapted to position an indicator or other element in accordance with the position of a remotely located element, and has for one of its objects to provide means for indicating with a high degree of accuracy the position of such remotely located element.

Another object is to provide an indicator which may be automatically restored to synchronism when it has fallen out of step with its transmitter. This is particularly advantageous in fire control systems, since if the current should go off at a critical time while the transmitter is being moved with relation to the indicator, synchronism between said transmitter and indicator will be automatically restored when the current comes on.

Other objects are to eliminate all make and break contacts such as are commonly employed in transmission systems, and at the same time to provide a sturdy, rugged and smooth running system of transmission.

Referring now to the drawings which illustrate what I now consider the preferred form of my invention:

Fig. 1 is an elevation of the receiving apparatus, parts being shown in section.

Fig. 2 is a side elevation of a spinning-up mechanism for a motor, certain circuit connections being indicated diagrammatically.

Fig. 2ª is a plan view of the parts shown in Fig. 2.

Fig. 3 is an elevation of a sending instrument, the casing being shown in section.

Fig. 4 is a detail of parts shown in Fig. 2.

Figs. 5, 6, and 7 are detail views of parts shown in Fig. 1.

Fig. 8 is a side elevation of certain clockwork mechanism, the casing being shown in section.

Figs. 9, 10, 11, and 12 are detail views showing different positions of parts of said clockwork mechanism.

Fig. 13 is a wiring diagram.

Fig. 14 is a detail view of certain indicating means shown in Fig. 1.

Fig. 15 is a detail plan view of an arrangement of certain contacts shown in Fig. 1.

Fig. 16 is a plan view of parts shown in Fig. 3.

My device is capable of wide application and may be used for indicating the angular position of any remotely located object, such as a sighting instrument or the readings of a compass card. In Fig. 3 I have shown by way of example a sending instrument comprising a casing 1 provided with a shaft 2 journalled in said casing and in a bracket 3. A pointer 4 may be mounted on said shaft for cooperation with a scale 5 on said casing. Obviously said shaft 2 might also carry any other object, such as a sighting instrument, the angular position of which is to be transmitted to a remote point. Fixed to said shaft is a gear 6, which may mesh with a crown gear 7 connected with a handle 8, whereby shaft 2 may be rotated by hand. Such rotating means it will be understood is merely shown as illustrative of any rotating means, power driven or otherwise. An auxiliary scale 5' is provided on casing 1 for cooperation with pointer 4' on the shaft of transmitter 10.

Transmitters 9 and 10 are connected to the sending instrument, the former being connected directly to shaft 2, and the latter connected with said shaft through gearing 11, 6. In Figs. 1 and 13, I have shown a repeater motor 12 adapted to be electrically connected to transmitter 9 and a repeater motor 13 adapted to be electrically connected to transmitter 10 in a manner hereinafter more specifically explained. While various types of transmitters and repeaters may be employed I prefer at present to employ instruments of a type well known in the art and each comprising a three phase stator and a single phase rotor.

Suitable means may be connected with repeater motors 12 and 13 for indicating accurately the position of pointer 4. One form of such means is shown in Figs. 1 and 14, wherein a reference member, such as a circular scale 16 is attached to shaft 17 of repeater 12, and a corresponding circular scale 18 concentric with scale 16, is connected to a sleeve 19 driven from shaft 20 of repeater 13 by any suitable means such as gearing 21, 22. Means such as a double pointer 23 fixed with relation to scales 16 and 18 as by means of a bracket 24 attached to the casing 25 of the receiving instrument is provided to cooperate with the graduations on said scales.

The electrical connections between the respective transmitters and their respective transmitters are as follows: Rotors 14 of transmitter 9 and repeater 12 are each connected through slip rings 26 and brushes 27 with single phase A. C. mains 28. The three phase stators 15 of transmitter 9 and repeater 12 are connected together, as are the stators 15' of transmitter 10 and repeater 13. Rotors 14' of transmitter 10 and repeater 13 are likewise connected to slip rings 26', and while said rotors may be connected in parallel to mains 28, I have shown them as connected to said mains in series through brushes 27'. A switch 129, the operation of which will be hereinafter set forth in detail, is provided for making and breaking the circuit through repeater 13. With the connections above described, it will be apparent to those skilled in the art that shaft 17 of repeater 12 will move in accordance with shaft 2 of transmitter 9 and that consequently a reference mark on scale 16 will be positioned in accordance with the position of pointer 4 when rotors 14 are energized. Likewise, when rotors 14' are energized scale 18 will move in accordance with the movements of the shaft of transmitter 10.

Since the shaft of transmitter 10 may make any desired number of revolutions during one revolution of shaft 2, depending upon the relative number of gear teeth between gears 6 and 11, it is evident that scale 18 may be graduated to indicate fractions of the readings obtained from scale 16. For example, if the ratio between gears 6 and 11, and 21 and 22 be such that such scale 18 makes one revolution whenever pointer 4 turns through ten degrees, scale 16 may, if desired, be graduated to indicate tens of degrees, and scale 18 to indicate units of degrees and minutes, as shown in Fig. 14. An accurate reading of the position of pointer 4 may thereby be secured.

In transmission systems of the type described the repeater rotor follows by steps the position of the transmitter rotor, and the number of steps during one complete rotation of the repeater rotor can be varied in accordance with various factors, such as the strength of current, character of rotor and stator windings, etc. By suitably gearing transmitter 10 to shaft 2 and scale 18 to shaft 20, it is evident that said scale can be moved through one-minute steps. For example, if the shaft of transmitter 10 makes one revolution during the rotation of pointer 4 through four degrees and the rotor of repeater 13 passes through 96 steps during one revolution of said shaft, one step through which said rotor turns will be equivalent to 2-1/2 minutes, and consequently if the ratio of gear 21 to gear 22 be 1 to 2-1/2, one step of scale 18 will be equivalent to one minute of arc. It is thus possible to read the position of pointer 4 accurately from circle 18 to one minute of arc.

With the gearing above described, it is apparent that scale 18 makes 36 revolutions to one revolution of pointer 4 and hence of scale 16. As shown in Fig. 14, the main graduations of scale 16, corresponding to the numerals thereon, designate tens of degrees, there being 36 such graduations, while scale 18 may be divided into ten main parts, represented by the heavy faced numerals, designating units of degrees, and each such main part may be divided into any suitable number of parts for indicating minutes. By way of example, I have shown such main parts as having four main sub-divisions, each subdivision in turn being divided into six smaller subdivisions. Of course, the number of sub-divisions can be varied as desired. Each main division of scale 16 may also, if desired, be suitably sub-divided, as for instance into ten equal sub-divisions for also indicating units of degrees.

In order for degrees and minutes to be read accurately from scales 16 and 18 it is essential that a definite relationship between the graduations on the scales be maintained. For example, the zero indication on scale 18 must be opposite the reference mark on pointer 23 whenever one of the numerals indicating tens of degrees on scale 16 lies opposite said reference mark. Furthermore, if said reference mark lies opposite a point between two of said numerals on scale 16, the zero point on scale 18 must be turned through a fraction of a revolution equal to the fraction of 1/36 revolution through which the numeral on scale 16 at the left of pointer 23 has turned, since scale 16 makes 1/36 revolution during one revolution of scale 18. In order to insure that the graduations on scale 18 are in the proper relationship to those on scale 16 so that the indicators are properly synchronized when the circuits through the transmitters and repeaters are closed I have provided the following mechanism:

A plurality of contacts 29, 30, 31, 32 may be mounted on a shaft 33 driven as through gears 34, 35, 36, and 37 from repeater shaft 17. Contacts 29, 30, and 31 are alike, and each may consist of a double contact portion 38 and insulation portions 39 and 40. Brushes 41 may be provided for engagement with the peripheries of said contacts. The contact portions of contacts 29, 30, and 31 are so arranged that when a contact portion of one contact passes out from under its cooperating brush, a contact portion of the next contact will come under its corresponding brush, and so on. Thus for one half revolution of shaft 33 a contact portion of each contact 29, 30, and 31 has passed from under its corresponding brush. Contact 32, as shown in Fig. 6, has no insulating portion. Each contact brush 41 may be provided with a binding post 42 for the attachment of lead-wires 43, 44, and 45. The gearing between repeater shaft 17 and shaft 33 is preferably such that when the scale 16 has moved from one ten-degree indication to the next, a contact portion of each contact 29, 30, and 31 has passed from under its cooperating brush. Leading from the brushes which contact with contacts 29, 30, and 31 are leads 43, 44, and 45 (Fig. 13) which are connected to corresponding contact segments 46, 47, and 48 mounted on a bracket 49 beneath scale 18. Bracket 49 may be supported in any suitable way, as by a bracket 50 mounted in the casing 25. As shown in Figs. 1 and 15, contact segments 46, 47, and 48 are insulated from each other and each may extend along an arc of substantially 120°. Movable with scale 18, as by being attached thereto, is a double brush 51, one portion 52 of which cooperates with segments 46, 47, and 48, and the other portion 53 with an annular contact 54 on bracket 49. Contact 54 is provided with a binding post 55 for a conductor 56 connected with the rotor of repeater 13 through one of brushes 27'. Segments 46, 47, and 48 are each provided with a binding post 57 for the attachment of conductors 43, 44, and 45, respectively.

The brushes 41 may be of spring material normally biased to a position out of engagement with the corresponding contacts. For lowering the brushes into engagement with their cooperating contacts I have shown cams 58 on a shaft 75 of certain clockwork mechanism in a casing 94, the operation of which will be described in detail later.

With the parts thus far described connected electrically as shown in Fig. 13, switch 129 being open and switch 61 closed, it will be seen that no current can flow through the rotor of repeater 13 unless arm 52 of brush 51 be in engagement with that one of contact segments 46, 47, or 48 corresponding with that one of contacts 29, 30, or 31 whose contact portion is in engagement with its corresponding brush 41. Upon the establishment of such current flow, the rotor of repeater 13 will be swung into a position corresponding with the position of the rotor of transmitter 10, as is well understood, and the scale 18 moved accordingly. If current could flow through both transmitter 10 and repeater 13 immediately upon the closing of switch 61, while the rotors of said transmitter and repeater would assume corresponding angular positions, the relation between the graduations of scales 16 and 18 might be disturbed. As an example, assume that the zero points on scales 16 and 18 correspond with the reference mark on pointer 23 and that the switch 129 is open with rotors 14' occupying the same angular position. If now pointer 4 be turned through 4° the rotor of repeater 12, and hence scale 16, will be turned through 4° also. If at this time switch 129 were closed, scale 18 would not be moved, since the rotor of transmitter 10 has turned through 360° back to its original position, and hence again occupies the same angular position as the rotor of repeater 13. The scale 18 would hence indicate a reading of zero degrees. By the arrangement which I have provided, however, whenever scale 16 turns through 1/3 of the angular distance between two adjacent ten degree indications, a contact portion of one of contacts 29, 30, and 31 slips out from under its cooperating brush and a contact portion of the next contact comes into position for engagement by its brush, and if such brushes are lowered by cams 58, and brush 52 is engaged with the segment 46, 47, or 48, electrically connected with the last mentioned contact portion a current will flow through rotors 14'. In the example above given, when the zero point of scale 18 corresponds with the reference mark on pointer 23, brush 52 is in contact with segment 46, and when the zero point of scale 16 corresponds with said reference mark, contact portion 38 of contact 29 is in engagement with the brush electrically connected with segment 46, assuming brushes 41 to have been lowered. However, when the zero point on scale 16 has moved through 4°, contact portion 38 of contact 29 has passed out of engagement with its brush and contact portion 38 of the next contact 30 has come into engagement with the brush, electrically connected with segment 47. In order for current to flow through rotors 14' it is thus essential to bring brush 52 into contact with segment 47, which necessitates movement of the zero point of scale 18 through 1/3 of a revolution or until the reading on scale 18 opposite the reference mark on pointer 23 is 3-1/3°. Such movement of scale 18 has resulted from a turning of the rotor of repeater 13, by means later to be described, and corresponds to a turning of said rotor through 5/6 of a revolution. When said rotor has turned through 5/6 of a revolution, however, brush 52 having been brought thereby into contact with segment 47, current will flow through rotors 14' and the rotor of repeater 13 will move, as is well understood in the art, into the same angular position as the rotor of transmitter 10. The rotor of repeater 13 will, therefore, in the example given, be moved through the remaining 1/6 of a revolution necessary to bring it into the same angular position as the rotor of transmitter 10, and this will result in a further turning of scale 18 through one-fifteenth of a revolution or through two-thirds of the distance between two adjacent numerals indicating units of degrees. Scale 18 having already been moved to a position wherein it indicates 3-1/3° will hence be moved through two-thirds the distance between the 3 and 4 degree indications, which will bring the 4 degree indication into coincidence with the reference mark on pointer 23. The scale 18 will thus indicate correctly the number of degrees through which pointer 4 has turned. The scales 16 and 18 are then in their correct relationship and switch 129 may be closed. From the arrangement of segments 46, 47, and 48 and contacts 29, 30, and 31 with relation to the graduations on scales 16 and 18 it will be seen that a circuit cannot be closed through rotors 14' when switch 129 is open until a point is reached such that by the passage of current through said rotors the reading on scale 18 can be caused to supplement exactly those of scale 16.

One form of means for causing a turning of the rotor of repeater 13 for moving brush 52 is shown in Figs. 1, 2, and 4 and is constructed as follows: Mounted on shaft 20 of repeater 13 is a gear wheel 62 adapted to mesh with toothed segment 63 mounted on an arm 64 pivoted to a bracket 65 on the casing of repeater 13. A spring 66, connected at one end with arm 64 and at the other with post 67 normally urges arm 64 toward the right as shown in Fig. 2, but said arm is normally prevented from such movement by means of a slidable stop rod 68 passing through bearings 69 and 70 on the casing of repeater 13 and engaging at its upper end with a suitable projection on arm 64. I have shown such projection as the end of a rod 72 pivoted to the arm 64 for a purpose to be explained later. The lower end of rod 68 bears, preferably through a roller 73, on the periphery of a cam 74 mounted on shaft 75, which shaft may also carry the cams 58 hereinbefore described. A spring 76 connected at one end to a projection on rod 68 and at its other end to bearing 70 may be employed to aid in keeping roller 73 at all times in engagement with the periphery of cam 74. When the cutaway portion 77 of cam 74 reaches roller 73, during rotation of the cam, the upper end of stop rod 68 will obviously be withdrawn from engagement with the end of rod 72, whereupon spring 66 will pull arm 64 to the right, as shown in Fig. 2, and thereby cause the teeth on segment 63 to rotate gear 62 and hence shaft 20. The rotation imparted to gear 62 and shaft 20 by segment 63 should be sufficient to bring brush 52 into contact with that one of segments 46, 47 and 48 which corresponds with that one of contacts 29, 30 and 31, whose contact portion is in engagement with its corresponding brush 41. In the construction which I have shown, the rotative impulse imparted by segment 63 and spring 66 to shaft 20 should be sufficient to cause rotation of said shaft through more than one revolution, such rotation continuing until a circuit is closed by brush 52 through repeater 13. For returning arm 64 to its position, shown in Fig. 2, I have shown rod 72 as connected with the armature of a solenoid 78, connected as shown diagrammatically in Fig. 2 with a battery 79, one terminal of which is connected to a contact 80 mounted on and insulated from support 81 for the repeater 13, and the other terminal of which is connected through insulated brush 82 bearing on a ring 83 of cam 74. Ring 83 is suitably insulated from shaft 75 and is connected to a contact segment 84 on cam 74. The parts are so designed that, after arm 64 has been pulled by spring 66 to rotate shaft 20 and before stop rod 68 is moved upwards to its position shown in Fig. 2, contact segment 84 will be brought into engagement with contact 80 and solenoid 78 will thereupon be energized to move arm 64 back to its position shown in Fig. 2 and to hold said arm in such position until after the upper end of stop rod 68 is moved in front of the end of rod 72, as shown in Fig. 2.

Since shaft 20 must not be rotated when arm 64 is returned by solenoid 78 to its original position, means should be provided for enabling gear 62 to turn idly on said shaft when arm 64 is being returned to its original position. One form of such means I have disclosed in Figs. 2 and 4 wherein gear 62 is shown mounted to turn loosely on shaft 20, and has a hub 85 provided with ratchet teeth 86 adapted to mesh with corresponding teeth on collar 87 attached to shaft 20 to rotate therewith. A spring 88, shown in Fig. 4, serves to yieldingly support said gear wheel. From the construction shown, it will readily be seen that when toothed segment 63 moves toward the right, shaft 20 will be rotated through the intermeshing of the ratchet teeth on hub 85 and collar 87, but that, when said segment moves back toward the left, said ratchet teeth will slip over each other and gear wheel 62 will turn without imparting any rotation to shaft 20. Obviously any suitable type of ratchet connection may be used between gear 62 and shaft 20. The teeth of segment 63 should preferably be out of contact with gear 62 when arm 64 is in the position shown in Fig. 2, thereby enabling gear 62 to turn with shaft 20 when said shaft is rotated.

In Figs. 1 and 7 I have shown one form of means for operating switch blade 129. A cam 90 on shaft 75 is designed with a projecting portion 91 adapted, when said cam is turned, to move switch blade 129 into the dotted line position in Fig. 7 wherein it may engage between cooperating contacts 92. Only one of said contacts is shown in Fig. 7. The blade 129 is normally biased to its open or full line position by a spring 93.

For operating stop rod 68, brushes 41 and switch 29 I prefer to employ means operated automatically by the making and breaking of the main circuit 28. One form of such means is shown in Fig. 1 and in detail in Figs. 8–12 and is constructed substantially as follows:

Contained within a casing 94 is a clockwork mechanism comprising a set of gears 95, 96, 97, and 98, driven by a spring 60, shown in dotted lines in Fig. 8, said spring being attached at one end to casing 94 and at the other to gear 95. Said gear 95 is fixedly attached to shaft 75 to rotate the latter. Mounted to turn with gear 98 is a pair of arms 99, each provided with a projection 100. Pivoted at 101 to casing 94 is an arm 102 provided at one end with a fork comprising arms 103, 104, provided with projections 105, 105' respectively, projecting in a direction opposite to that of projections 100. At its opposite end, arm 102 carries an armature 106 adapted to be attracted by alternating current electromagnet 107 connected across mains 28. A spring 108 connected at one end to arm 102 and at the other to a bracket 109 on casing 94 serves to raise the end of arm 102 carrying armature 106, when magnet 107 is deenergized.

Between pivot 101 and arms 103 and 104, arm 102 is provided with a depending portion carrying a roller 110. On gear wheel 95 are projecting surfaces 111 and 112, with which roller 110 is adapted to cooperate in a manner now to be described.

In Fig. 8 the parts just described are in the position normally occupied when no current is present in mains 28. In this position, projection 105 lies in the path of a projection 100. If now a circuit is closed through mains 28 so that current flows therethrough, armature 106 is drawn towards magnet 107 and projection 105 raised out of the path of projection 100. Before, however, armature 106 has moved towards magnet 107 a sufficient amount to bring projection 105' into the path of projection 100, roller 110 is brought into engagement with projecting surfaces 111 and further downward movement of armature 106 is prevented. The parts then occupy the position shown in Fig. 9. The gear train 95, 96, 97, and 98 is thus free to be rotated by its spring. Such rotation will occur immediately and will continue until gear 95 has turned through 310°, whereupon an offset portion 113 of surface 111 is brought opposite roller 110, and armature 106 then moves further downwardly towards magnet 107 until roller 110 contacts with the said offset portion 113. At this time, projection 105' has been brought opposite one of projections 100 (see Fig. 10) and rotation of the gear train in casing 94 ceases. The parts remain in this position until the circuit through mains 28 is broken. Thereupon, spring 108 acts to raise armature 106 and thereby lower arms 103 and 104. Before, however, projection 105 is lowered into the path of projection 100, roller 110 comes into contact with surface 112 as shown in Fig. 11 and gear 95 is again free to rotate. Projecting surface 112 is mounted eccentrically on gear 95 and is so designed that, when said gear has turned through one complete revolution, roller 110 has been permitted to move downwardly far enough for projection 105 to be once more brought into the path of a projection 100 (see Fig. 8). Rotation of the gear train is again stopped and will not take place again until armature 106 is again attracted by magnet 107.

During one complete rotation of gear 95, shaft 75 of course causes cams 74, 91, and 58 each to make one complete revolution. These cams are so constructed and arranged with respect to shaft 75, as shown on the drawings, that they operate in the following sequence:

When current starts to flow in mains 28 and gear 95 commences to rotate, a certain amount of rotation of said gear, say through 90°, without causing the spinning up of shaft 20 is permitted so that if pointer 4 is being moved scale 16 can be brought into synchronism with said pointer. As gear 95 continues to rotate say beyond 90° the flattened portion 77 of cam 74 is brought beneath stop rod 68, and the repeater shaft 20 is thereby spun up to set arm 51 in motion. It should be noted in this connection that spring 66 should not have sufficient strength to turn shaft 20 against the action of the current which flows when a circuit is closed through repeater motor 13. After such circuit has been closed the position of shaft 20 is governed by the current flowing and not by spring 66. The purpose of said spring is to rotate shaft 20, and thereby brushes 52, and 53, until a current flows through repeater motor 13. When gear 95 has turned through 135° cams 58 lower brushes 41 into engagement with their corresponding contacts so that current can flow through rotors 14' when brush 52 is in contact with that one of segments 46, 47 and 48 which is connected to that brush which is in engagement with a contact portion of one of contacts 29, 30, and 31. It will be seen that cams 58 are so designed that brushes 41 will be maintained in contact with their respective contacts until gear 95 has turned through about 280°, whereupon the brushes will be allowed to spring back to their normal position and will not be a load on repeater 12. By the time gear 95 has turned through about 265°, sufficient time has elapsed for the scales 16 and 18 to be brought into their correct relationship, and the projecting portion 91 of cam 90 thereupon moves switch blade 129 into engagement with contacts 92, and thereby closes a circuit through rotors 14' independent of the brushes 41 and 52. Gear 95 then continues to rotate until it has turned through about 310°, as above explained, when rotation thereof ceases until the circuit through mains 28 is broken. The parts are preferably so designed that gear 95 turns through 310° in about two seconds. By the time that gear 95 has turned through 310° a circuit through solenoid 78 will have been made and broken, so that arm 64 will have been retracted, and, before the circuit through said solenoid is broken, stop rod 68 will again have been moved into the path of the end of rod 72. When current ceases to flow through mains 28, gear 95 will rotate from its 310° position to its 360° position, during which time, for example when the 325° position is reached, cam 90 permits spring 93 to return switch blade 129 to its full line position in Fig. 7, and the circuit through rotors 14' is broken. The parts are then in position to repeat the cycle of operations above set forth.

It is not necessary that the cycle of operations performed by the clockwork shaft 75 follow the exact sequence described, as brushes 41 might be lowered before instead of after motor shaft 20 is spun up.

It will be thus seen that I have provided means for enabling one to read easily and accurately the position of a distant object to minutes of arc, and for insuring that the cooperating indicators are properly synchronized with each other before coming into operation. As has already been pointed out, repeater motor 13 and scale 18 are automatically brought into synchronism with the transmitting instrument including the pointer 4 when brushes 41 and 52 engage contacts electrically connected with each other, and hence said repeater motor and scale are self-synchronizing within such limits. Beyond such limits, that is, when brushes 41 and 52 do not engage contacts electrically connected with each other, said repeater motor and scale are not self-synchronizing and, therefore, must be brought within such limits before they can be self-synchronized with the transmitting instrument. The means for bringing said repeater motor and scale within such limits comprises, of course, the means for rotating shaft 20 and arm 51 as well as contacts 29, 30, and 31 which are governed by repeater motor 12. The latter motor and scale 16 always move in synchronism with the transmitting instrument and, as has already been explained, if pointer 4 should be moved when the current is off, repeater 12 and scale 16 automatically assume a position corresponding to pointer 4 when the current comes on, so that repeater motor 12 and scale 16 are completely self-synchronous.

It should, furthermore, be noted that no make and break contacts as commonly used in transmission systems are employed, and hence the inconvenience of frequently adjusting and cleaning such contacts is eliminated. Furthermore a more powerful torque can be obtained in my improved transmission system than can be obtained with the ordinary direct-current make and break contact transmission system. The humming noise incident to the flow of the alternating current employed in the system which I have disclosed, moreover, furnishes a convenient indication that the system is in operation.

As above pointed out, transmitter 10 and repeater 13 may each be connected in parallel to mains 28, in which case switch 129 would merely prevent the flow of current through the rotor of repeater 13 and not through the rotor of transmitter 10.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a transmitting instrument, a repeating instrument, current mains, connections between said mains and said instruments, a circuit closer in the connections to one of said instruments, and means for automatically actuating said circuit closer at a predetermined time after the establishment of a flow of current through said mains.

2. In combination, a pair of non-mechanically connected repeaters, a pair of disconnected indicators controlled thereby, a pair of transmitters connected to said repeaters respectively, and means including circuit closing contacts controlled by one of said repeaters for maintaining said indicators in such position with relation to each other that one indicates fractions of the other.

3. In combination, a pair of repeaters, a transmitter for each repeater, current mains to which said transmitters and repeaters are adapted to be connected, and means including a source of power separate from said mains and controlled jointly, by a repeater and said power source for closing a circuit between the other of said repeaters and its transmitter.

4. In combination, a pair of repeaters, indicators controlled by said repeaters, and means including a brush controlled by one of said repeaters and contacts controlled by the other of said repeaters for closing an electric circuit through one of said repeaters.

5. In combination, a repeater motor including a rotatable armature, current mains and means comprising a spring impelled member for imparting rotation to said armature in response to the establishment of a flow of current in said mains.

6. In combination, a repeater motor including a rotatable armature, current mains means comprising a spring impelled member for imparting rotation to said armature in response to the establishment of a flow of current in said mains, and means for normally holding said member against the action of said spring.

7. In a transmission system, a synchronizer including a rotatable member, means for rotating said member, a movable element adapted to prevent rotation of said member, means for moving said element for permitting such rotation, and means comprising a cam surface on said member and a projection on said element for preventing movement of said element into position for stopping rotation of said member until the latter has rotated a predetermined amount.

8. In a repeater system, a receiving instrument adapted to be actuated from a sending instrument and comprising a self-synchronous repeater motor connected thereto, an indicator controlled by said motor, a second repeater motor mechanically disconnected from said first motor connected to said sending instrument for finer readings and self-synchronous within certain limits, an indicator controlled by said second repeater motor for supplementing the indications of the first mentioned indicator, and means brought into action upon excitation of the system and governed by said first motor for bringing the second motor within such limits.

9. In a repeater system, a receiving instrument adapted to be actuated from a sending instrument and comprising a self-synchronous repeater motor connected thereto, an indicator controlled by said motor a second repeater motor connected to said sending instrument for finer readings and self-synchronous within certain limits, an indicator controlled by said second repeater motor for indicating fractions of the indications of the first mentioned indicator, and means brought into action upon excitation of the system for first bringing the second motor within such limits and then placing the same in circuit with the sending instrument.

10. In a transmission system, a receiving instrument adapted to be electrically connected with a transmitting instrument and including normally inoperaive power means, means for setting said power means for operation when the current in the transmission system ceases, and means for releasing said power means for operation when the current comes on.

11. In a transmisison system, a repeater adapted to be electrically connected with a transmitter, means for breaking the connection between said repeater and transmitter when the flow of current ceases, and means brought into action when the current comes on for first bringing said repeater to a predetermined position and then reestablishing the connection between said transmitter and repeater.

12. In a transmission system, a repeater, a transmitter electrically connected therewith, means for breaking the connection between said repeater and transmitter when the flow of current ceases, and means brought into action when the current comes on for reestablishing said connection.

13. In a synchronous transmission system, a plurality of repeater motors adapted to be driven at different speeds, and means brought into action independently of said motors for bringing the faster motor into a certain phase relation with the slower motor.

14. In a synchronous transmission system, the combination with a source of E. M. F., a plurality of electric repeater motors adapted to be driven at different speeds therefrom, and means including a source of power separate from said source of E. M. F. for bringing the faster motor into a certain phase relation with the slower motor.

15. In a synchronous transmission system, the combination with a plurality of transmitters and a source of electrical supply, a plurality of electric repeater motors adapted to be driven at different speeds by said transmitters, and means for bringing the faster motor into a certain phase relation with the slower motor, said means including a source of power separate from said electrical source for first rotating said faster motor and then coupling the aforesaid supply to said faster motor.

16. In a synchronous transmission system, a plurality of electric repeater motors, a transmitter electrically connected with each of said motors and with a source of electrical energy for driving said motors at different speeds, and means for causing the faster motor to select a position in the proper phase relation to the slower motor and then bringing said faster motor under the control of its transmitter.

17. In a synchronous transmission system, a plurality of electric repeater motors adapted to be driven at different speeds, a selecting device driven by the slower motor and adapted to be temporarily connected with the faster motor, and means for rotating the faster motor, connecting it with the selecting device and then breaking said connection.

18. In a synchronous transmission system, a receiving instrument adapted to be actuated from a sending instrument and including a plurality of repeater motors connected to said sending instrument for simultaneous movement at different speeds, an indicator, a one-to-one connection between said indicator and one of said repeaters, a second indicator, reduction gearing between said second indicator and another of said repeaters, and means for insuring such relationship between said indicators that the second indicates fractions of the indications of the first.

19. In a synchronous transmission system, a receiving instrument adapted to be actuated from a sending instrument and including a repeater motor connected thereto, a second repeater motor connected to said sending instrument for movement simultaneous with said first mentioned repeater but at a different speed, an indicator actuated by the first mentioned repeater, an indicator actuated by said second repeater for indicating fractions of the indications of the first mentioned indicator, connections between the second mentioned indicator and said second repeater for driving the former at a different speed than the latter, and means brought into action upon excitation of the system for restoring said indicators to such relation that the second indicates fractions of the indications of the first in case such relationship has been lost.

20. In combination, a transmitting instrument, a repeating instrument, current mains, connections between said mains and said instruments, a circuit closer in the connections to one of said instruments, and means for automatically actuating said circuit closer in response to the failure of a flow of current through said mains.

21. In a transmission system, a synchronizer including a rotatable member, means for rotating said member, a pivotally mounted element adapted to prevent rotation of said member, means for moving said element for permitting such rotation, and means for automatically bringing said element into position for stopping further rotation of said member after the latter has rotated a predetermined amount.

22. In a transmission system, a synchronizer including a rotatable member, means for rotating said member, a pivotally mounted element adapted to prevent rotation of said member, means for moving said element for permitting such rotation, and means comprising cooperating parts on said element and member for moving the former into position to stop further rotation of said member after the latter has rotated a predetermined amount.

23. In a synchronous transmission system, a plurality of electric repeater motors adapted to be driven at different speeds, means brought into action by the excitation of the system for imparting rotation to the faster motor before the latter is electrically connected to the system, means for temporarily closing a circuit through the faster motor when the latter has attained a certain relationship to the slower motor, and means for subsequently establishing another electric connection between said faster motor and the system and breaking said temporary circuit.

24. In a synchronous transmission system, a plurality of electric repeater motors, transmitters connected to said repeaters, respectively, and to a source of electrical supply for driving said repeaters at different speeds, a circuit closer for placing the faster repeater in communication with said source, means for operating said circuit closer to break the connection between said faster repeater and said source when the system is de-energized, and means brought into action when the system is again energized for imparting rotation to said faster motor prior to its connection to said source, closing a circuit thru said faster motor when the latter has attained a certain relationship to the slower motor, and subsequently operating said circuit closer to connect said faster motor with said source.

25. In a synchronous transmission system, a plurality of electric repeater motors adapted to be driven at different speeds, a circuit closer for connecting the faster motor to a source of electrical supply, means for operating said circuit closer to disconnect said motor from said source upon failure of current in the system, indicators driven by said motors, respectively, and means brought into action upon the establishment of current in the system for first imparting rotation to the faster motor, then closing a circuit through said faster motor when the indicators are in such relation that one supplements the readings of the other, and then operating said circuit closer to connect the faster motor to said source.

26. A synchronous transmission system including an electric repeater motor, and means brought into action upon excitation of the system for imparting rotation to said motor prior to closing a circuit therethrough.

In testimony whereof I have affixed my signature.

ELMER A. SPERRY.